G. M. JOHNSON.
CAR CHECK.
APPLICATION FILED SEPT. 6, 1917.
1,338,225.
Patented Apr. 27, 1920.
2 SHEETS—SHEET 2.
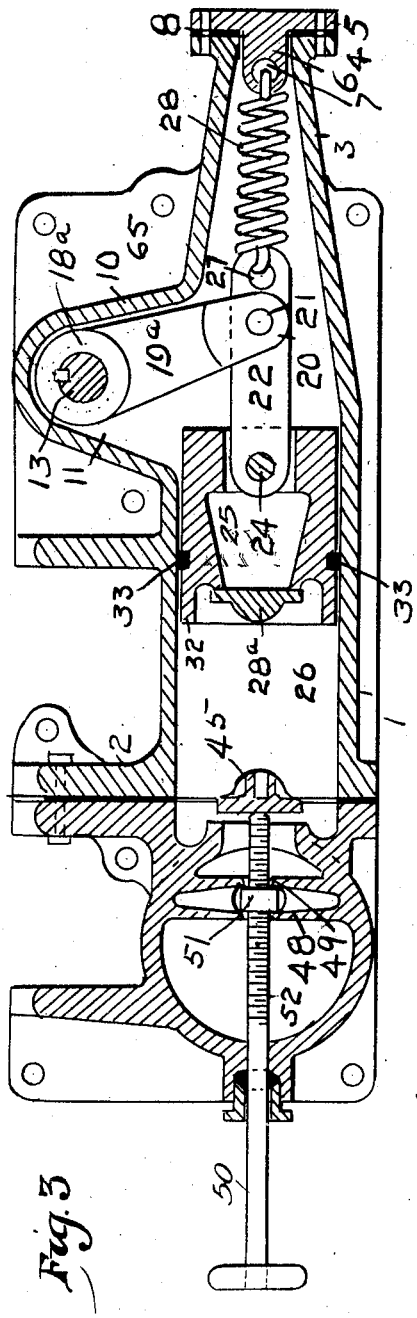
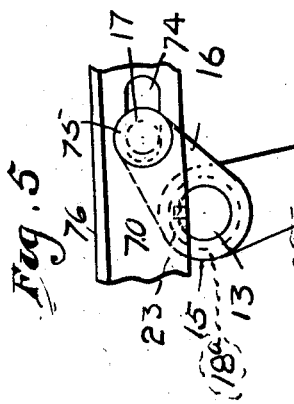
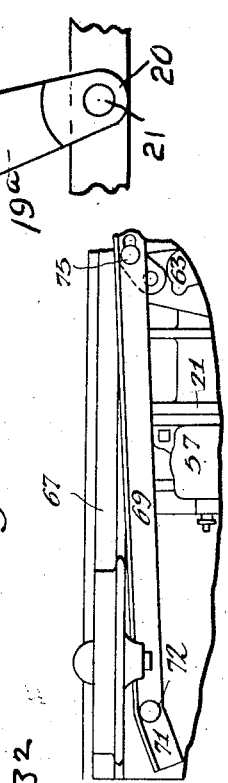
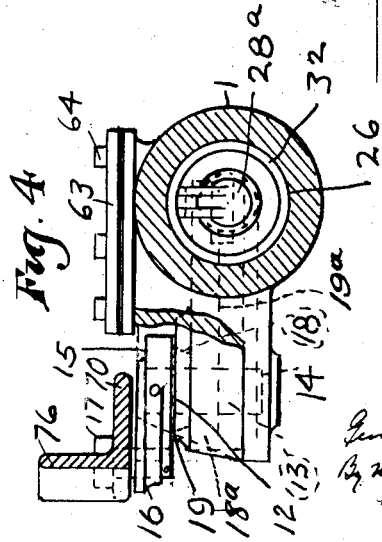
WITNESS
R.F.Dilworth
INVENTOR,
George M. Johnson
By Max H. Srolong
his attorney

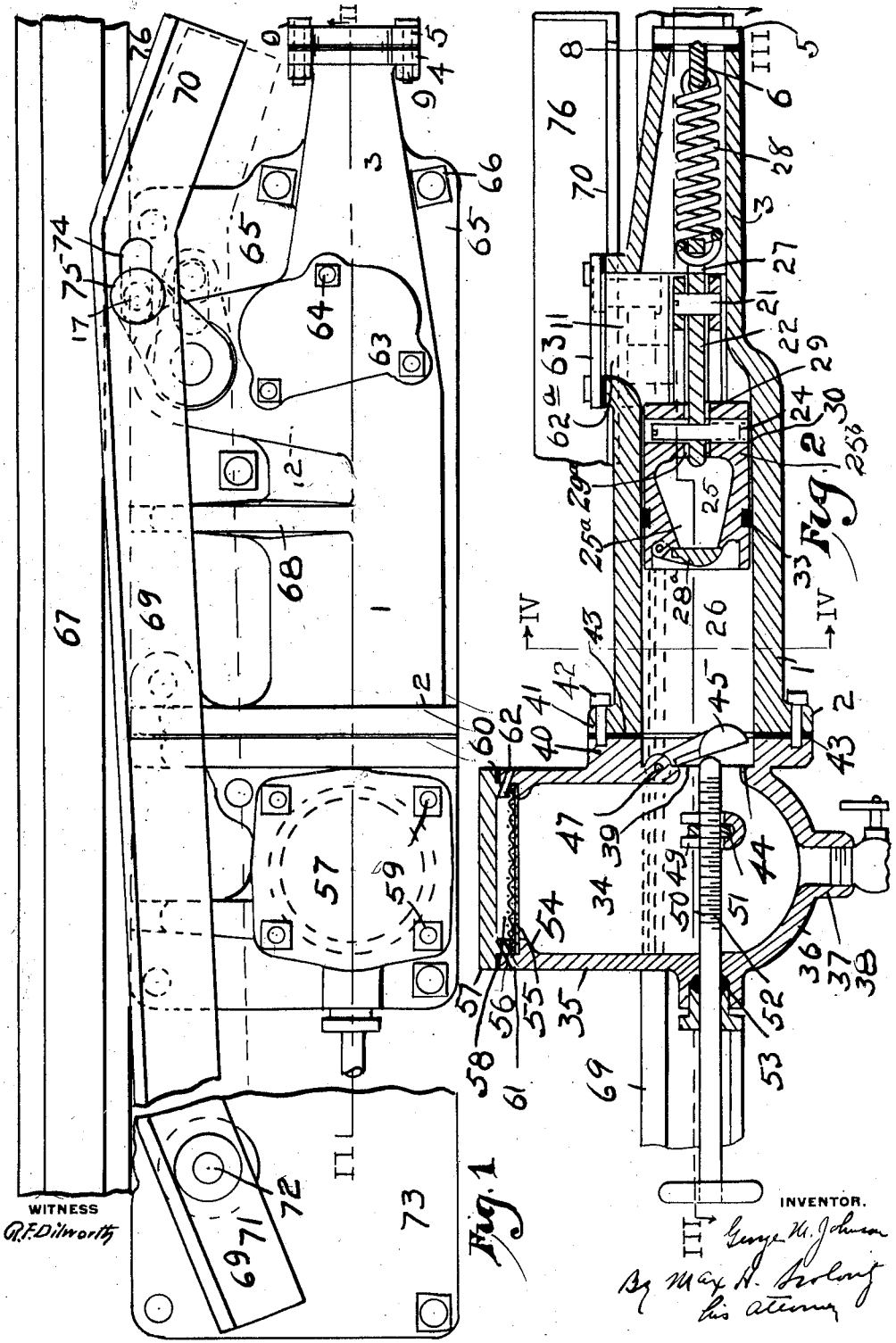

UNITED STATES PATENT OFFICE.

GEORGE M. JOHNSON, OF McDONALD, PENNSYLVANIA.

CAR-CHECK.

1,338,225.	Specification of Letters Patent.	Patented Apr. 27, 1920.

Application filed September 6, 1917. Serial No. 189,987.

*To all whom it may concern:*

Be it known that I, GEORGE M. JOHNSON, a citizen of the United States of America, residing at McDonald, county of Washington, and State of Pennsylvania, have invented certain new and useful Improvements in Car-Checks, of which the following is a specification.

This invention relates to car checks designed primarily for use in retarding the travel of mine cars, although it is to be understood that the device forming the subject matter of this application can be employed for any purpose wherein it is found applicable, and the invention has for its object to provide, in a manner as hereinafter set forth, a fluid controlled retarding mechanism automatically operated by the wheels of a car for the purpose of retarding the speed of the car under such conditions reducing possibility of damage to a minimum due to collision.

As is well known in connection with mine cars, when traveling toward the cage, that when the speed of the car is not arrested it will coast upon the cage and not only damage it, but any car or cars mounted thereon, and to overcome these serious objections is one of the advantages of the invention, and to this end the invention aims to provide, in a manner as hereinafter set forth, a regulatable fluid controlled and automatically operable car check, operating against the webs of the wheels of the car, whereby the flanges of the wheel will be forced against the head of the trackrail, and the speed of the car retarded.

A further object of the invention is to provide a car check, in a manner as hereinafter set forth, including a fluid controlled retarding mechanism provided with regulating means whereby the speed, at which the car travels over the check rail can be regulated.

Further objects of the invention are to provide a car check for the purpose set forth which is comparatively simple in its construction and arrangement, strong, automatic in its action, having conveniently operative means for regulation, efficient and convenient in its use, readily set up adjacent a trackrail and comparatively inexpensive to manufacture.

With the foregoing and other objects in view the invention consists of a novel construction, combination and arrangement of parts as hereinafter more specifically described and illustrated in the accompanying drawing wherein is shown an embodiment of the invention, but it is to be understood that changes, variations and modifications can be resorted to which come within the scope of the claims hereunto appended.

In the drawings wherein like reference characters denote corresponding parts throughout the several views:

Figure 1 is a top plan view, broken away, of a car check in accordance with this invention showing the adaptation thereof in connection with a trackrail.

Fig. 2 is a longitudinal sectional view on line II—II Fig. 1.

Fig. 3 is a sectional plan on line III—III Fig. 2.

Fig. 4 is a cross-sectional view on line IV—IV Fig. 2.

Fig. 5 is a detail of the link mechanism for shifting the checkrail.

Fig. 6 is a detail showing a car wheel engaging the checkrail.

When using the device, two checks are employed, each fastened to the track adjacent one of two parallel trackrails, and the check can be arranged interiorly or exteriorly with respect to the trackrail; preferably the device is arranged interiorly of the rail.

The check consists of a resistance cylinder 1, provided at one end with a flange 2, and at its other end with a conical extension 3, having its free terminus flanged as at 4, and to which is secured a head-plate 5, having its inner face provided with an inwardly extending lug 6, formed with an opening 7. The lug 6 projects into the extension 3. The head 5, has interposed therebetween and the flange 4 a gasket 8. The head 5 is connected to the flange 4 by securing devices 9.

The cylinder 1 and extension 3 are off-set as at 10, to provide chamber 11 for a purpose to be presently referred to.

The top of the chamber 11 is indicated as at 12, and which is provided with an opening for the passage of a shaft 13, having its lower end mounted in the bottom 14, of the chamber 11 (see Fig. 4). Connected to the upper end of the shaft 13 is the collar 15, of a crank arm 16; the latter has its free end provided with a stud 17. The collar 15 rests upon the top 12 of the chamber 11, and said top is cut away to provide a seat 18 for a packing ring 19 which extends into the collar 15 and around shaft 13.

Secured to the lower end of the shaft 13 is the collar 18ª of a crank arm 19ª having a bifurcated inner end 20, which is pivotally connected as at 21 to a connecting link 22.

The collar 18ª is keyed to the shaft 13 as at 23. The crank arm 19ª projects into the extension 3 in which operates the connecting link 22; the latter is pivotally connected, as at 24, to a piston 25, which operates in a piston chamber 26, formed by the cylinder 1. The other end of the connecting link 22, is attached to one end, as at 27, of an expansible and contractible coil spring 28; the latter at its other end is connected to the lug 6.

The function of the spring 28, is to restore the piston 25, to inoperative position which is as shown in Fig. 3. The function of the crank arms 16 and 19ª, and the connecting link 22, is to shift the piston rearwardly to control the movement of the checkrail, to be hereinafter referred to, when the device is employed to retard the speed of the car.

The piston 25, is provided with a chamber 25ª, the latter, when the piston is shifted rearwardly, is closed by pivoted flap-valve 28ª, arranged within the rear end of the piston 25. The flap-valve 28ª, is opened when the piston 25, is shifted forwardly. The forward portion of the piston 25, as indicated at 25ᵇ, is formed with a bore 29ª, which opens into the chamber or pocket 25ª. The forward portion 25ᵇ, of the piston 25, has a transverse opening 30, which intersects the bore 29.

The connecting link 22, which also may be termed a piston rod, extends through the bore 29, and into the chamber or pocket 25ª, and the said link 22, is pivotally connected to the piston 25, by a coupling pin 31, which is mounted in the transverse opening 30.

The resistance cylinder 1, is adapted to contain a body of fluid, preferably oil, and the rearward movement of the piston 25, is controlled by the discharge of the fluid from the chamber 26. During the rearward movement of the piston, the fluid, such as oil, will leak past the piston 25, but on the return movement of the piston, the valve 28ª, will be swung open and the fluid will be drawn through the bore 29, into the pocket 25ª, and discharged from said chamber, as the valve 28ª, will automatically open as the piston moves forwardly. The piston 25, has an annular flange 32, which surrounds the valve 28ª and said piston is furthermore, provided with a packing ring 33, which engages the wall of the chamber 26, during the travel of the piston 25.

The car check further includes an oil reservoir or container 34, which is formed by a receptacle 35, the latter has a rounded bottom 36, provided with an outlet nipple 37, normally closed by a cut-off 38. One side of the receptacle 35, is formed with a port 39, which constitutes an inlet or a discharge opening for the oil in the container 34, that is to say, when the oil or fluid is forced from the chamber 26, by the piston 25, the port 39, then constitutes an inlet for the container 34, and when the oil or fluid is drawn into the chamber 26, by the movement of the piston, when traveling forwardly, due to the action of the spring 28, the oil or fluid in the container 34, is drawn through the port 39, into the chamber 26, and the port then constitutes an outlet. One side of the receptacle 35, has formed integral with the periphery, a boss or collar 40, to which a flange 41, of the resistance cylinder 1, is connected by securing devices 42. Interposed between the collar 40, and the flange 41, is a gasket 43. That point of the periphery of the receptacle 35, which is surrounded by the collar 40, as indicated at 44, provides a seat for a controlling valve 45, the function of the latter is to regulate the discharge of oil or fluid from the chamber 26, so as to control the movement in one direction of the piston 25. The valve 45 is pivotally connected, as at 47, to the body of the receptacle 35.

The receptacle 35, has formed integral with the interior thereof, a partitioned web 48, provided with openings 49, for the passage of an adjusting stem 50, for the valve 45. Mounted in the web 48, is a nut 51, with which engages the threaded inner portion 52, of the stem 50. The web 48, is so set up, that the nut 51, will be held fast therein, whereby, when the stem 50, is adjusted, nut 51, will not turn and will hold the stem 50, in adjusted position.

The stem 50, projects outwardly from the receptacle 35, and suitable packing elements 53, are provided for the stem 50, to prevent leakage.

The receptacle 35, has the inner face of its body, near its top, formed with an inwardly extending annular flange 54, providing a seat for a strainer-element, consisting of a strip or sheet of canvas, or other suitable fabric 55, and a foraminous strip 56, the latter being superposed on the former.

The receptacle 35, is closed by a flanged cover 57, the flange of the latter being indicated at 58, and which bears on the strip 56. Securing devices 59, are provided for securing the cover 57, in position. A gasket 60, is interposed between the cover 57 and the top of the body of the receptacle 35.

The foraminous strip 56 is employed for reinforcing the strip of fabric 55, and the strainer element formed by the strips 55, 56, is used to prevent discharge of oil from the container 34, but not to prevent the discharge of air, or in other words the strainer element is employed to prevent the air forced from the container 34, from carrying off particles of oil. The air forced from the container 34, is discharged through alining ports 61, 62, formed respectively in the flange 58 and the body portion of the receptacle 35.

The resistance cylinder 1, and extension 3, have an entrance opening 62ª which is normally closed by a removable cover plate 63, the latter being detachably connected in position by securing devices 64.

The receptacle 35, resistance cylinder 1 and extension 3, have lateral webs 65, through which extend securing devices 66, for fixedly maintaining said extension, cylinder and receptacle, in position relative to the trackrail 67.

The receptacle 35 and cylinder 1, have lateral supports 68, for a checkrail 69, the latter shifting on the supports 68, when occasion so requires.

The checkrail 69, is in the form of an angle-shaped bar, having the ends 70, 71, extended at an angle with respect to the intermediate portion of said checkrail and toward the other elements of the device. The checkrail has its end 71 pivotally mounted, as at 72, upon a supporting plate 73; the latter is fixedly secured in position. The intermediate portion of the checkrail, that is that part which extends from the end 71, to the end 70, is disposed at an inclination with respect to the trackrail 67. The checkrail 69, when mounted in position is arranged above the tread of the trackrail 67, and the forward part of the intermediate portion of said checkrail 69, slightly extends over the tread of the trackrail 67. The intermediate part of the checkrail 69, in proximity to the inclined end 70, is formed with an elongated longitudinal slot 74, through which the stud 17 extends. A head indicated at 75, is employed for connecting the stud 17, to the checkrail 69. The slot 74, in connection with the stud 17, and head 75, provides a slidable connection between the checkrail 69, and the crank arm 16. The crank arm 19ª is of greater length than the crank arm 16. The key 23 not only couples the collar 18ª of the crank arm 19ª, with the shaft 13, but also couples the collar 15, of the crank arm 16.

It will be assumed that the elements of the device are in position, as shown in dotted lines in Fig. 1, which is that the piston 25, has been shifted rearwardly, due to the action of the checkrail 69, upon the operative connection therebetween and the piston 25. When pressure is relieved on the checkrail 69, the spring 28, moves the piston 25, forwardly and shifts the crank-arm 16 and the checkrail 69, the latter will be shifted to the position shown in Fig. 1. The spring 28, when pressure is relieved from off the checkrail 69, moves the piston 25, forwardly to the position shown in full lines in Fig. 3.

The position of the checkrail 29, is such that the vertical leg 76, thereof, will be engaged by the flange of the car-wheel as the car travels along the track, thereby shifting the checkrail, against the pressure of the spring 28, and the oil or fluid drawn into the chamber 26, on the forward movement of the piston. The fluid or oil within the chamber 26, sets up an abutment to retard the rearward movement of the piston and owing to such abutment the checkrail 69, cannot be moved quickly by the car-wheels to provide clearance, due to the retardation of the rearward stroke of the piston. The rearward movement of the piston is controlled by the discharge of oil or fluid from the chamber 26, and such movement fast or slow is governed by the size of the discharge opening of the chamber 26, which is formed by the bore 39, the latter being controlled by the valve 45. If the oil is discharged slowly from the chamber 26, the rearward movement of the piston 25, is slow but if the oil is discharged rapidly from the chamber 26, the rearward stroke of the piston 25, is fast. If the stroke of the piston is slow, the checkrail moves correspondingly; under such conditions the travel of the car in contact with the checkrail will be slow. If the stroke of the piston is fast the checkrail moves correspondingly, and the travel of the car will be rapid. It is obvious, in view of the control of the discharge from the chamber 26, that by properly adjusting stem 50 the speed of the car can be regulated to the point desired.

What I claim is:

1. A car check comprising a pivoted checkrail capable of being shifted by the wheels of a car, and a regulatable fluid cushioned retarding mechanism for said rail, said rail being disposed at an inclination with respect to a trackrail, and said rail further having angle-shaped end portions, one of said angle-shaped end portions being pivoted, and means normally holding the checkrail in the path of travel of the car wheel slidably connecting said retarding mechanism to said rail in proximity to the other angle-shaped end portion.

2. A car check comprising a pivoted checkrail capable of being engaged by the wheels of a car for shifting it on its pivot, a piston operatively connected with said rail and shifted in one direction when the rail is shifted by the wheels of a car, means to provide a fluid cushion for the movement of said piston in one direction, and means for regulating the discharge of fluid to control the movement of the checkrail.

3. A car check comprising a pivoted checkrail, a resistance cylinder having a piston operating therein, means for slidably connecting the piston to the checkrail, a fluid container capable of communicating with said cylinder, a resilient element connected with the piston, and means for controlling discharge of fluid from the cylinder to the container to regulate the movement of the piston in one direction.

4. A car check comprising a pivoted checkrail, a resistance cylinder having a piston operating therein, means for slidably connecting the piston to the checkrail, a fluid container capable of communicating with said cylinder, a resilient element connected with the piston, and means for controlling discharge of fluid from the cylinder to the container to regulate the movement of the piston in one direction, said container provided with air outlets, and further having a strainer element below said outlets.

In testimony whereof I affix my signature in the presence of two witnesses.

GEORGE M. JOHNSON.

Witnesses:
MAX H. SROLOVITZ,
LUELLA H. SIMON.